Oct. 4, 1927.
C. F. WALSH
1,644,212
FARROWING HOUSE FOR SOWS
Filed Jan. 11, 1926
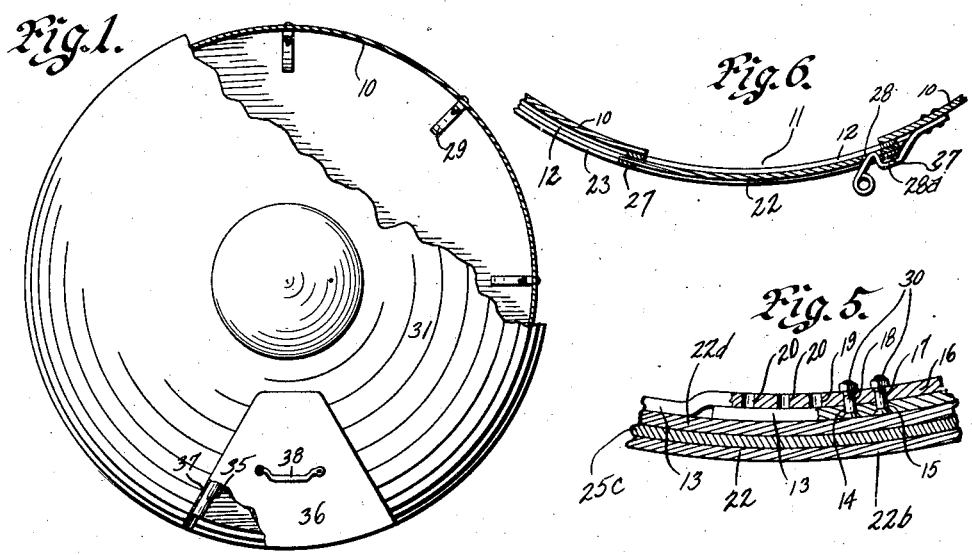
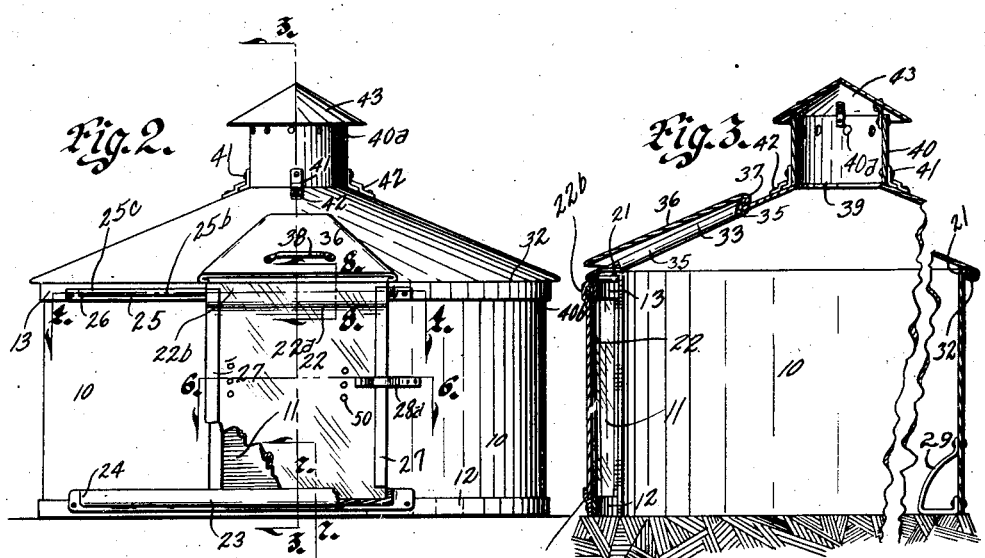

Patented Oct. 4, 1927.

1,644,212

UNITED STATES PATENT OFFICE.

CLARENCE F. WALSH, OF DICKENS, IOWA.

FARROWING HOUSE FOR SOWS.

Application filed January 11, 1926. Serial No. 80,513.

The object of my invention is to provide a farrowing house for sows of simple, durable and inexpensive construction.

More particularly, it is my object to provide a small, readily, portable farrowing house preferably of sheet metal, which will be long-lived, and easily handled.

More particularly in this connection, it is my intention to provide such a farrowing house having its parts so constructed and arranged that they may be readily and easily assembled or disassembled, and that they may be conveniently nested for occupying a minimum of space for storage and transportation.

With these and other objects in view, my invention consists in the construction, arrangement and combination of the various parts of my farrowing house for sows, whereby the objects contemplated are attained, as hereinafter more fully set forth, pointed out in my claims, and illustrated in the accompanying drawings, in which:

Figure 1 shows a top or plan view of a hog house of the kind embodying my invention, parts being broken away and parts being shown in section.

Figure 2 shows a front elevation of the house, parts being broken away and parts being shown in section.

Figure 3 is a detail, sectional view taken on the line 3—3 of Figure 2, parts being broken away.

Figure 4 is a horizontal, detail, sectional view taken on the line 4—4 of Figure 2.

Figure 5 is a similar view enlarged, illustrating the joint of the reinforcing member at the top of the door.

Figure 6 is a detail, sectional view taken on the line 6—6 of Figure 2.

Figure 7 is a detail, sectional view taken on the line 7—7 of Figure 2; and

Figure 8 is a similar view taken on the line 8—8 of Figure 2.

My improved hog house comprises a main wall, preferably bent so as to form a round house and indicated generally in the accompanying drawings by the reference numeral 10.

At what may be for convenience called the front of the house, a portion of the wall is omitted to leave a door opening 11. This wall 10 is preferably made of some suitable material, which has some resiliency, and which can be readily bent, and which will endure the weather, such for instance as galvanized iron.

On the outside of the wall 10 at the bottom is a reinforcing band 12 of strap iron or the like having some resiliency, which is provided with overlapping ends in the door opening, which will be hereinafter more fully referred to.

Near the top of the wall 10 on the outside, a similar strap iron reinforcing strip 13 is secured to the wall.

In Figure 5, I have shown the manner of connecting together the overlapping ends of the members 12 and 13 respectively.

No detail of the member 12 is shown, because its construction and arrangement is the same as that of the member 13, except as to their location on the wall.

One end of each member 12 and 13 has a pair of spaced holes, as indicated at 14 and 15, and the other end has a series of spaced holes, as indicated at 16, 17, 18, 19, 20 and so forth.

The portion of the wall 10 projecting above the reinforcing strip 13 has at its upper edge a downwardly and outwardly turned flange 21, extending around the wall from one edge of the door opening to the other.

I provide for the door opening a sliding door 22.

Fixed to the lower strap iron reinforcing member 12 is a guide strap or the like 23, which projects slightly outwardly and then upwardly from the reinforcing member 12, as illustrated in Figure 3, from one end of the door opening 11 across said opening and thence for a further distance about equal to the width of said door opening.

The upper portions of the guide strip 23 at the ends thereof are bent inwardly as at 24 to form stops for limiting the sliding movement of the door 22.

Mounted on the upper reinforcing strip 13 is a guide strip 25, which extends from a point near one edge of the door opening across the door opening and further for a distance about equal to the width of the door opening.

The guide strip 25 has a lower part of flange 25$^a$, and a central, outwardly, extending portion 25$^b$, terminating in an upwardly extending portion 25$^c$. The portions 25$^b$ and 25ᶜ are flattened against the strip 13, as at 26, to form stops for the door at the ends of the guide 25.

The door 22 has at its sides on its outer surface the upright reinforcing strips 27, which terminate at the lower edge of the door just above the member 23, and at the upper edge of the door just below the strip 25.

The upper part of the door is bent outwardly as at 22ª, thence inclined upwardly as at 22ᵇ, thence inwardly as at 22ᶜ, and thence downwardly as at 22ᵈ to form a downwardly opening channel to receive the upper edge of the portion 25ᶜ of the guide strip 25.

The door has near one side the opening 28, shown in Figure 6, and a spring catch device 28ª is fastened to the wall 10 and is designed to enter the opening 28 for locking the door in closed position.

The door has ventilating openings 50.

On the inside of the wall at the bottom part, I preferably mount the inwardly projecting stirrup-shaped members 29, which are for the purpose of keeping the mother sow from crushing small pigs between herself and the lower part of the wall 10.

The members 29 may be spaced apart at such suitable distances as may be desired.

Before describing the roof of my improved hog house, it may be desirable to mention that the ends of the respective reinforcing members 12 and 13 may be connected together to form these members into continuous elements by means of two or more bolts 30. These bolts may be removed, whereupon it will be noted that I have provided a house having a broken wall, which may be contracted or expanded somewhat, so that several walls may be nested one inside the other with the lower edge of each inner wall resting upon the stirrup-like members 29 of the next outer wall. This structure is of great convenience for economy of space in storing the hog houses and in shipping them.

I provide a removable top for my improved hog house, comprising a cone-shaped member 31, preferably made of sheet metal, having at its lower edge a flange 32, as shown for instance in Figure 3, inclined from the outer edge of the top or roof inwardly, as shown in said figure.

The top or roof 31 has in one side a ventilating and sunshine opening 33, preferably triangular, with its upper apex squared, as indicated in Figure 1.

The metal around the edge of this opening 33 is bent upwardly and then outwardly to form a channel-shaped flange 35.

I provide a removable closure member 36 of proper shape to close the opening 33, having on its under side at its edges, except its lower edge, a flange 37 having the form of an inwardly opening channel to coact with the outer wall of the channel-shaped member 35.

By sliding the closure member 36 upwardly, it can easily be removed. It is preferably provided with a handle 38.

I provide at the upper, central portion or apex of the top or roof 31 a central opening 39 above which is a cupola, comprising the cylindrical member 40, having in its lower end the series of downwardly and outwardly inclined strap iron members 41.

On the roof 31 near the upper edge thereof, I provide a series of keepers 42.

The cupola member 40 may be rested on the upper, central part of the roof 31, in such position that the strap iron members 41 do not register with the keepers 42, and then may be rotated until the lower edges of the members 41 slide under the upper parts of the members 42, whereupon the cupola member 40 will be locked in place.

The cupola member 40 is preferably provided with a cone-shaped roof or top 43.

It will be seen that by rotating the cupola, it may be removed from or assembled on the hog house top or roof, as may be desired.

When it is removed, and the roof is not assembled on the house, a number of the roofs may be conveniently nested for economy of space.

The cupola member 40 is preferably provided with ventilation holes 40ª.

In the practical assembly of my improved hog house, the main wall is contracted in any suitable way to a diameter smaller than that which it is ultimately to have.

The roof is placed above the wall and then the wall is expanded until the flange 21 slides into the channel formed by the flange 32 and the roof 31, whereupon it is obvious that the roof will be properly and rigidly locked to the wall 10.

It will be noted that the roof overhangs the door as clearly shown in Figure 3 in such manner as to prevent the door from being removed accidentally by being off the portion 25ᶜ of the guide strip 25.

Various means may be employed for effecting the contracting and expanding action of the wall 10.

In the construction here shown, a nail or the like is inserted through one of the holes 17, 18, 19 or 20 and into the hole 14 and is used to pry or force the wall for expanding or contracting it.

When the wall has reached its proper diameter when expanded or contracted in this way or in any other way, the roof will be locked to the wall and the bolts 30 may be assembled in position for locking the house in its completely assembled position.

It will thus be seen that I have provided a farrowing house of very simple construction, having a number of advantages.

The house is of light weight and if of five or six feet in diameter can be readily moved from place to place on the farm.

It is easy to take a hog house of this kind apart, because all that has to be done is to first remove the cupola member 10, as explained.

By taking the nuts off the bolts 30 and pulling one end of each member 13 and 12 off the bolts, and thereafter in any way contracting the total diameter of the wall 10, the flange 21 can be withdrawn from engagement with the channel at the lower edge of the roof, and the roof can then be lifted off and moved from place to place or stored.

The advantage of having a device of this kind which can be nested for transportation is obvious.

A farmer can haul several of these houses at one load by nesting the walls and tops in the manner hereinbefore described.

The house, of course, can be used for a great variety of animals and purposes.

Some changes may be made in the details of the construction and arrangement of the parts of my improved hog house without departing from the essential features and purposes of my invention, and it is my intention to cover by my claims, any modified forms of structure or use of mechanical equivalents, which may be reasonably included within their scope.

I claim as my invention:

1. In a house of the class described, a circular, resilient wall having a door opening extending from its top to its bottom, members projecting from the ends of the wall across the door opening having overlapping adjustably connected ends, whereby the wall may be adjusted to different circumferences, a cone-shaped top having at its bottom an in-turned flange, said wall being provided at its top with an out-turned flange, whereby when the top is placed on the wall and the wall is contracted and then expanded, the flanges will interlock, and said members may be fastened together for holding the parts in locked position.

2. In a house of the class described, a circular, resilient wall having a door opening extending from its top to its bottom, members projecting from the ends of the wall across the door opening having overlapping adjustably connected ends, whereby the wall may be adjusted to different circumferences, a cone-shaped top having at its bottom an inturned flange, said wall being provided at its top with an out-turned flange, whereby when the top is placed on the wall and the wall is contracted and then expanded, the flanges will interlock, and said members may be fastened together for holding the parts in locked position, and a door slidably mounted at its upper end for cooperating with the door opening.

3. In a house of the class described, a wall having a door opening extending from its top to its bottom, a guide and supporting member extending across the upper part of the door opening, a door having a portion overhanging said supporting member and sliding thereon, a top for the house detachably mounted on the house and overhanging the wall thereof and arranged to prevent the accidental removal of the door from its support.

Des Moines, Iowa, December 30, 1925.

CLARENCE F. WALSH.